United States Patent [19]

Aisaka et al.

[11] 4,290,828
[45] Sep. 22, 1981

[54] METHOD FOR MANUFACTURING BIMETAL

[75] Inventors: Tatsuyoshi Aisaka; Mitsuo Kawai; Fumio Mori; Shinzo Sugai, all of Yokohama, Japan

[73] Assignee: Tokyo Shibaura Electric Co., Ltd., Kawasaki, Japan

[21] Appl. No.: 56,689

[22] Filed: Jul. 11, 1979

Related U.S. Application Data

[62] Division of Ser. No. 880,301, Feb. 22, 1978, Pat. No. 4,207,381.

[30] Foreign Application Priority Data

Feb. 23, 1977 [JP] Japan .................................. 52-18082
Mar. 2, 1977 [JP] Japan .................................. 52-21496

[51] Int. Cl.³ ............................ C22F 1/00; C21D 7/00
[52] U.S. Cl. ................................ 148/11.5 Q; 148/12 R
[58] Field of Search ........................ 148/11.5 Q, 12 R

[56] References Cited

U.S. PATENT DOCUMENTS 3,238,071 3/1966 Holtzman et al. ............. 148/11.5 Q

FOREIGN PATENT DOCUMENTS 51-125623 11/1976 Japan .

OTHER PUBLICATIONS

Yershova et al., Fiz. Metal Metalloved, 13, No. 1, pp. 107-113, 1962.
Lysak et al., Fiz. Metal Metalloved, 25, No. 3, pp. 562-565, 1968.

Primary Examiner—R. Dean
Attorney, Agent, or Firm—Cushman, Darby & Cushman

[57] ABSTRACT

A bimetal is disclosed having a high, rapid deflection over a specified temperature range, including a high expansion metal alloy component having a high thermal expansion coefficient that changes rapidy at $50 \times 10^{-6}/°C$. or greater at a temperature of between about 100° C. and 250° C. and containing from 15-30% by weight of manganeses, the balance of iron. The second component has a substantially constant thermal expansion coefficient regardless of the temperature change, and is preferably a stainless steel. These bimetals are used in circuit breakers, thermal protectors and the like.

19 Claims, 2 Drawing Figures

METHOD FOR MANUFACTURING BIMETAL

This is a division of application Ser. No. 880,301 filed Feb. 22, 1978 now U.S. Pat. No. 4,207,381.

BACKGROUND OF THE INVENTION

This invention relates to a bimetal and more particularly to a bimetal which is rapidly deflected at an optionally specified high temperature and indicates a satisfactory reversible behavior depending on temperature change.

The deflection of the prior art bimetal generally proceeds at a substantially fixed rate in proportion to temperature change. Where, therefore, it was desired to use the known bimetal in such application as required the bimetal to make a rapid deflection over a prescribed temperature range, for example, the application where a bimetal was directly used in a contact drive mechanism, it was necessary to provide an additional quick responsive drive mechanism. The quick responsive drive mechanism includes, for example, a repulsion board, magnet or spring. A combination of a bimetal and any of these quick responsive drive mechanisms enabled the original slow deflection of the bimetal itself to be carried out quickly. However, a bimetal device which was provided with the above-mentioned quick responsive drive mechanism had the drawbacks that the bimetal device as a whole becomes bulky and had to be manufactured with a complicate design.

The known bimetal indicating a rapid deflection over a certain temperature range includes martensite transformation such as an Ni-Ti alloy utilizing a shape memory effect. This shape memory type alloy has to be deformed under a specified temperature condition before being used as a bimetal. And, said shape memory type alloy does not indicate the same rate of deflection when used frequently, failing to be effectively used in practice. Moreover, the above-mentioned type of bimetal had the drawbacks that it indicated a rapid deflection at a relatively low temperature, and had insufficient workability and bandability, presenting difficulties in manufacture.

A bimetal rapidly deflectable at a specified temperature is generally used for temperature control of household electric appliances and as a safety device for various industrial apparatuses. Therefore, the above-mentioned bimetal is desired to have as high an anticorrosive property as possible.

SUMMARY OF THE INVENTION

It is accordingly an object of this invention to provide a novel bimetal which makes a rapid deflection over a specified temperature range without the aid of the aforesaid quick responsive drive mechanism, that is, a bimetal whose high expansion layer is prepared from the known iron-manganese alloy containing manganese causing the resultant bimetal to have a high thermal expansion coefficient, and indicates prominent workability and bondability and a satisfactory reversible behavior relative to temperature change.

Another object of the invention is to provide a novel bimetal of the above-mentioned type which is further rendered anticorrosive.

DETAILED DESCRIPTION OF THE INVENTION

Figure 1:
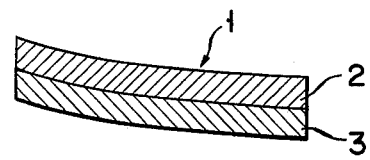
FIG. 1 shows a vertical sectional view of bimetal according to this invention.
Figure 2:
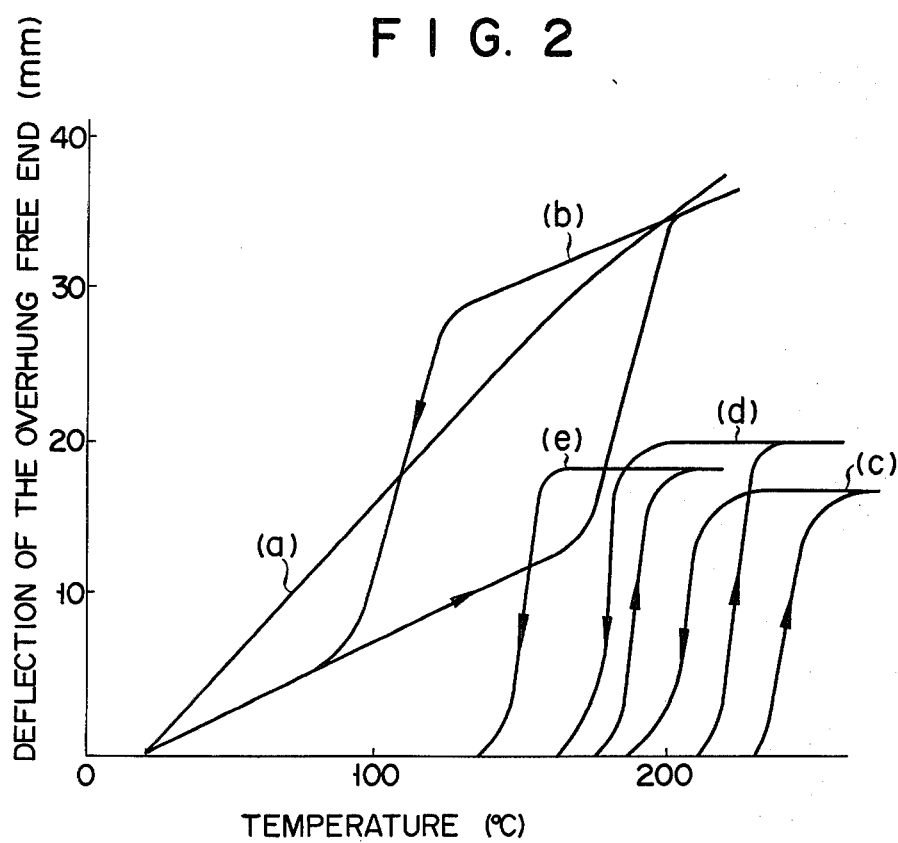
FIG. 2 shows the deflection of the free end of the bimetal of this invention relative to temperature change and that of the prior art bimetal.

A bimetal according to this invention comprises a first alloy component which rapidly indicates a deflection greater than $50 \times 10^{-6}/°C$. at an optionally specified high temperature, and a second alloy component which is bonded to the first alloy component and whose thermal expansion coefficient remains substantially fixed relative to temperature change. The second alloy component has substantially the same thermal expansion coefficient as that which is indicated by the first alloy component at a temperature lower than that at which the thermal expansion coefficient of said first alloy component rapidly increases.

The first alloy component is formed of 15 to 30% by weight of manganese and substantially iron as the remainder. Or the first alloy component is prepared from 15 to 30% by weight of manganese, and a member selected from the group consisting of 2 to 15% by weight of chromium, 2 to 15% by weight of cobalt and 2 to 20% by weight of a mixture of chromium and cobalt, and substantially iron as the remainder.

The first alloy used as the high expansion component of the present bimetal has its composition specifically restrictively defined for the following reasons.

Manganese is an important element to increase the thermal expansion coefficient of a bimetal and also cause the thermal expansion coefficient to be rapidly varied relative to temperature change. The amount of manganese needed to cause the thermal expansion coefficient to be rapidly varied at an optionally specified temperature ranges from 15 to 30% by weight, and preferably 15 to 25% by weight. The thermal expansion coefficient of a bimetal indicates a value of approximately $50 \times 10^{-6}$ to $400 \times 10^{-6}/°C$. near that point included in the above-mentioned range of the manganese content at which a rapid change occurs in the thermal expansion coefficient.

Chromium is an important element in a bimetal having high anticorrosive property. The amount of chromium required to improve the anticorrosive property is selected to be over 2% by weight. The amount of needed to let the thermal expansion coefficient of a bimetal fall within the above-mentioned range has been found to be less than 15% by weight. Therefore, the prescribed content of chromium is set between 2% and 15% by weight.

Cobalt has the same function as chromium, and its content is also preferred to range from 2% to 15% by weight for the reason given above.

With this invention, it is possible to use both chromium and cobalt for improving the anticorrosive property of a bimetal. In this case, it is preferable advised to mix both elements in a total amount larger than 2% by weight in order to increase the anticorrosive property of a bimetal. Further, the total content of a mixture of chromium and cobalt should be less than 20% by weight or preferably 15% by weight.

Impurities are unavoidably carried into the raw materials of the present bimetal such as carbon, oxygen, nitrogen, sulphur, phosphorus, and aluminium or silicon purposely added as a deoxidant at the time of disolution of the raw materials will not obstruct one effect of the bimetal according to this invention, provided the total amount of all these materials is less than 1% by weight. Nickel, known as an element adapted to increase the anticorrosive property of a bimetal will not reduce the effect of the present bimetal, provided the nickel content is smaller than 3% by weight.

thermal expansion coefficients indicated by the alloy samples before and after the temperature of rapid deformation was reached, and also of the thermal expansion coefficients indicated by the alloy samples over the temperature range from room temperature to 200° C.

TABLE 1

| Sample No. | Chemical Composition | | | | | Temperature of rapid change in TEC (°C.) | TEC before said rapid change | TEC after said rapid change | TEC over a range from room temperature to 200° C. |
| --- | --- | --- | --- | --- | --- | --- | --- | --- | --- |
| | Fe | Mn | Ni | Cu | Cr | | | | |
| 1 | Bal. | 6.3 | — | — | — | No rapid deformation | — | — | $12.8 \times 10^{-6}/°C.$ |
| 2 | " | 10.0 | — | — | — | No rapid deformation | — | — | $15.5 \times 10^{-6}/°C.$ |
| 3 | " | 15.8 | — | — | — | 228 | $17.5 \times 10^{-6}/°C.$ | $52.0 \times 10^{-6}/°C.$ | — |
| 4 | " | 18.0 | — | — | — | 217 | 18.7 | 201 | — |
| 5 | " | 20.3 | — | — | — | 209 | 21.5 | 233 | — |
| 6 | " | 25.0 | — | — | — | 161 | 20.5 | 175 | — |
| 7 | " | 28.9 | — | — | — | 150 | 18.2 | 94.2 | — |
| 8 | " | 30.0 | — | — | — | 121 | 17.6 | 53.4 | — |
| 9 | " | 40.8 | — | — | — | No rapid deformation | — | — | $11.5 \times 10^{-6}/°C.$ |
| 10 | — | Bal. | 11.0 | 18.3 | — | No rapid deformation | — | — | $28.6 \times 10^{-6}/°C.$ |
| 11 | Bal. | 1.05 | 9.11 | — | 17.9 | No rapid deformation | — | — | $17.8 \times 10^{-6}/°C.$ |
| 12 | " | 1.22 | 20.3 | — | 24.7 | No rapid deformation | — | — | $16.9 \times 10^{-6}/°C.$ |
| 13 | " | 0.4 | 36.7 | — | — | No rapid deformation | — | — | $2.57 \times 10^{-6}/°C.$ |
| 14 | " | 0.55 | 42.0 | — | — | No rapid deformation | — | — | $5.40 \times 10^{-6}/°C.$ |

The second alloy constituting the low thermal expansion component of the bimetal of this invention is formed of Invar, for example, an iron-nickel system (the nickel proportion ranging between 36% and 50% by weight). The second alloy is preferred to be the type whose thermal coefficient remains substantially fixed near that temperature at which the thermal expansion coefficient of the first alloy constituting the high thermal expansion component of the present bimetal commences to increase rapidly, and further is smaller than the increased thermal expansion coefficient of the first alloy.

The second alloy of low thermal expansion should preferably be prepared from an alloy having substantially the same thermal expansion coefficient as that which is indicated by the first alloy of high thermal expansion at a lower temperature than that at which the thermal expansion coefficient of said first alloy begins to increase rapidly, for example, austenitic stainless steel such as SUS304, SUS310. Application of the second alloy of the above-mentioned type prominently increases the effect of this invention.

This invention will be more fully understood by reference to the examples which follow.

EXAMPLE 1

First, experiments were made on the deflection of a bimetal relative to temperature change to examine its behavior characteristics. For these experiments, alloys having the compositions shown in Table 1 below were selected. Samples were prepared by melting the alloys in a high frequency induction furnace, followed by annealing for thorough elimination of strains. Measurement was made of the thermal expansion coefficients (abbreviated as "TEC") of the alloy samples and the temperatures at which said thermal expansion coefficients indicated a rapid change, the results being set forth in Table 1 below. Measurement was further made of the As apparent from Table 1 above, the samples Nos. 3 to 8 among the samples Nos. 1 to 10 of high thermal expansion alloys used in the above-mentioned experiment represent those whose thermal expansion coefficients rapidly changed at the respective definite temperature levels. The samples Nos. 11 to 14 denote alloys of low thermal expansion. The second Fe-Mn alloy of low thermal expansion used with this invention has substantially the same thermal expansion coefficient as the alloy samples Nos. 11, 12 of Table 1. The alloy samples Nos. 11, 12 were austenitic stainless steel SUS304 and SUS310.

The high thermal expansion alloy samples 2 and low thermal expansion alloy samples 3 shown in Table 1 were combined as shown in Table 2 below to produce bimetal samples 1 (FIG. 1).

TABLE 2

| Sample No. | Sample Nos. of Table 1 | | Modulus of longitudinal elasticity (kg/mm²) | |
| --- | --- | --- | --- | --- |
| | High thermal expansion alloy | Low thermal expansion alloy | | |
| 15 | 10 | 13 | 12500 | Control |
| 16 | 1 | 13 | 14700 | " |
| 17 | 3 | 13 | 15700 | Example |
| 18 | 5 | 13 | 15400 | " |
| 19 | 7 | 13 | 15100 | " |
| 20 | 9 | 13 | 13400 | Control |
| 21 | 1 | 11 | 15800 | " |
| 22 | 3 | 11 | 17500 | Example |
| 23 | 5 | 11 | 17600 | " |
| 24 | 7 | 11 | 17600 | " |
| 25 | 9 | 11 | 14100 | Control |
| 26 | 1 | 12 | 16200 | " |
| 27 | 3 | 12 | 17800 | Example |
| 28 | 5 | 12 | 18300 | " |
| 29 | 7 | 12 | 18100 | " |
| 30 | 9 | 12 | 14700 | Control |

The bimetal samples were prepared in the following manner. The alloy samples of high and low thermal expansion were thermal forged into thick plates. The upper surface of each forged plate was ground and the lower surface thereof was finished by brushing. Both alloy plates were bonded together by rolling at a temperature of 900° C. to 950° C. with both plates made to have a thickness ratio of 1:1. After thus rolled, both plates were further subjected to cold rolling. Annealing was repeated at 1050° C., each time an assembly of laminated plates had its thickness reduced by 35% by rolling in order to eliminate accumulated work strains. A bimetal chip measuring 1 mm×10 mm was cut out of the sample thus prepared. Repetion of annealing for thorough elimination of work strains is indispensable to suppress the occurrence of such harmful phase ($\alpha'$ phase) as obstructs a rapid change in the thermal expansion coefficient of a bimetal at a specified temperature (shown in Table 1). Said annealing may be undertaken before or after both alloy layers are bonded together.

Measurement was made of the modulus of longitudinal elasticity of the samples Nos. 15 to 30, the results being also set forth in Table 2. As seen from Table 2 above, the bimetal samples embodying this invention (Nos. 17 to 19, 22 to 24, 27 to 29) had a far more improved modulus of longitudinal elasticity than the controls.

The bimetal samples of Table 2 (Nos. 15 to 30) were further tested on their deflecting property relative to temperature change to determine their behavior characteristics. Determination of the deflecting property was effected by measuring the displacement of the overhung free end portion of each sample 100 mm long, the results being presented in FIG. 1. The arrows shown therein indicate the direction in which the deflection of the respective samples resulting from heating and cooling proceeded. The curve (a) of FIG. 1 denotes the deflecting property of the typical prior art bimetal (sample No. 15) and the curve (b) represents the deflecting property of the bimetal (sample No. 17) of this invention whose high expansion component was formed of a Fe-Mn alloy and chose low expansion component was prepared from a Fe-Ni alloy. The curves (c) to (e) indicate the deflecting property of the bimetals of this invention (samples Nos. 27 to 29) whose high expansion component was formed of a Fe-Mn alloy and whose low expansion component was prepared from austenitic stainless steel SUS310.

As seen from FIG. 1, the deflection of sample No. 15, that is, the typical prior art bimetal (curve (a)) proceeded almost linearly relative to temperature change. In contrast, the bimetals of this invention (curves (b) to (e)) were found to behave very sensitively at a temperature of rapid change in the thermal expansion coefficient and indicate hysteresis by heating and cooling. Further, FIG. 1 shows that a temperature of rapid deflection can be easily set at any desired level by controlling the content of manganese, and that the temperature admitting of rapid deflection substantially falls within a high level range from 100° C. to 250° C. The curves (c) to (e) indicate that the thermal expansion coefficient of the bimetal of this invention whose low expansion alloy component was formed of austenitic stainless steel SUS310 did not rapidly change before the temperature of rapid deflection was reached, because both high and low expansion alloy components and substantially the same thermal coefficient, but that when the temperature of rapid deflection was reached, then said bimetal very sensitively behaved, namely, showed a rapid deflection.

As mentioned above, the bimetal of this invention which is rapidly deflected at a specified temperature is not rapidly fused to a contact drive mechanism when directly used therewith, thereby effecting a satisfactory result. The bimetal of this invention indicates a rapid deflection at a higher temperature than the prior art bimetal utilizing the shape memory effect such as a Ni-Ti alloy. Moreover, the present bimetal shows a rapid deflection over a wider temperature range more broadened than has been possible in the past by properly controlling the content of manganese, chromium or cobalt.

EXAMPLE 2

A bimetal was prepared by the same manufacturing process as used in producing the aforesaid Fe-Mn alloy with chromium and/or cobalt added to a high expansion alloy component in order to render the resultant bimetal anticorrosive. Experiments were made with this bimetal to determine not only the deflecting characteristic as in the preceding case but also the anticorrosive property. 1 to 20% by weight of chromium and similarly 1 to 20% by weight of cobalt were added to the above-mentioned Fe-Mn alloy to such extent that the total amount of a mixture of chromium and cobalt indicated 2 to 20% by weight. The whole mass was melted in a high frequency induction furnace to prepare samples. These samples were also tested for the deflecting property. These high expansion alloy samples were bonded with low expansion alloy samples to provide bimetal samples which were expected to indicate an anticorrosive property. Test showed that the bimetal samples thus prepared had exactly the same deflecting property as the Fe-Mn bimetal.

Experiments on an anticorrosive property were undertaken with the samples having a chemical composition shown in Table 3 below.

TABLE 3

| Sample No. | Chemical Composition | | | | Temperature of rapid change in TEC (°C.) | TEC before said rapid change ($10^{-6}$/°C.) | TEC after said rapid change (× $10^{-6}$/°C.) |
| --- | --- | --- | --- | --- | --- | --- | --- |
| | Fe | Mn | Cr | Co | | | |
| 101 | Bal. | 20 | 1 | — | 175 | 21.4 | 230 |
| 102 | " | 20 | 2 | — | 170 | 21.5 | 239 |
| 103 | " | 20 | 5 | — | 160 | 20.9 | 374 |
| 104 | " | 20 | 10 | — | 140 | 19.8 | 357 |
| 105 | " | 20 | 15 | — | 120 | 20.2 | 223 |
| 106 | " | 20 | 20 | — | — | — | 16.6* |
| 107 | Bal. | 20 | — | 1 | 176 | 19.5 | 268 |
| 108 | " | 20 | — | 3 | 164 | 21.1 | 283 |
| 109 | " | 20 | — | 5 | 169 | 18.6 | 267 |
| 110 | " | 20 | — | 10 | 158 | 20.7 | 251 |
| 111 | " | 20 | — | 15 | 154 | 20.3 | 173 |
| 112 | Bal. | 20 | — | 20 | — | — | 18.3* |
| 113 | Bal. | 20 | 1 | 1 | 168 | 21.0 | 211 |
| 114 | " | 20 | 2 | 1 | 160 | 20.3 | 205 |
| 115 | " | 20 | 2 | 5 | 161 | 19.2 | 272 |
| 116 | " | 20 | 5 | 1 | 157 | 18.7 | 272 |
| 117 | " | 20 | 5 | 5 | 151 | 19.8 | 232 |
| 118 | " | 20 | 10 | 3 | 171 | 20.1 | 128 |
| 119 | " | 20 | 10 | 5 | 152 | 19.9 | 102 |
| 120 | " | 20 | 3 | 15 | 143 | 18.2 | 68.0 |
| 121 | " | 20 | 5 | 20 | — | — | 17.2* |

*Thermal expansion coefficient over a change from room temperature to 200° C.

In the greater part of the experiments, the content of manganese was restricted to 20% by weight as shown in Table 3. The low expansion alloy components were prepared from the material of the aforesaid samples Nos. 11, 14. Bimetal samples were provided by combinations of high and low thermal expansion alloy components shown in Table 4

TABLE 4

| Sample No. | Sample Nos. High expansion alloy | Sample Nos. Low expansion alloy | Weight loss due to corrosion (mg/cm$^2$) | |
|---|---|---|---|---|
| 122 | 103 | 11 | 0.527 | Example |
| 123 | 103 | 14 | 0.580 | " |
| 124 | 101 | 11 | 0.872 | Control |
| 125 | 101 | 14 | 0.902 | " |
| 126 | 110 | 11 | 0.441 | Example |
| 127 | 110 | 14 | 0.408 | " |
| 128 | 107 | 11 | 0.911 | Control |
| 129 | 107 | 14 | 0.964 | " |
| 130 | 118 | 11 | 0.245 | Example |
| 131 | 118 | 14 | 0.251 | " |
| 132 | 113 | 11 | 0.621 | Control |
| 133 | 113 | 14 | 0.630 | " |
| 134 | 5 | 11 | 1.046 | " |

The corrosion test was carried out by dipping the bimetal samples for 100 hours in 5% salt water at room temperature and measuring the subsequent weight loss of said samples, the results being set forth in Table 4 above. As apparent from Table 4, the bimetals of this invention were subject to less weight loss by corrosion, namely, had a higher anticorrosive property than those of the control.

The bimetals of this invention prepared by the method of Example 2 were found not only to indicate a rapid deflection at a specified temperature but also display a prominent anticorrosive property.

The bimetals of the invention are prepared, as described in the foregoing examples, from inexpensive material with a satisfactory reversible property, and are adapted for use with great economic advantage as a safety device such as a circuit breaker for household electric appliances and a thermal protector for various industrial apparatuses.

Apart from the above-mentioned application of a bimetal utilizing its original function, the bimetal of this invention is easily adapted to be used as an interleaf layer between two laminated nickel or copper plates or as a cover plate for either nickel or copper plate for improvements on the properties of electric appliances, for example, reduction of electric resistance.

What we claim is:

1. A method of manufacturing a bimetal exhibiting a hysteresis and a rapid deflection over a predetermined temperature range, comprising the steps of:
   (a) providing a first metal component of a high expansion metal alloy whose thermal expansion coefficient rapidly changes from $21.5 \times 10^{-6}/°C$. or less to $50 \times 10^{-6}/°C$. or more at a temperature of between 100° C. and 250° C.,
   said high expansion metal alloy being selected from a first alloy consisting of 15 to 30% by weight of manganese and substantially iron as the remainder or a second alloy consisting essentially of 15 to 30% by weight of manganese, and a member selected from the group consisting of 2 to 15% by weight of chromium, 2 to 15% by weight of cobalt and 2 to 20% by weight of a mixture of chromium and cobalt and the balance of iron;
   (b) providing a second metal component of a low expansion metal alloy having a thermal expansion coefficient substantially constant regardless of temperature changes;
   (c) annealing the first metal component repeatedly to substantially eliminate work strains contained therein; and
   (d) bonding together said first and second metal components.

2. A method according to claim 1 wherein said first metal component is provided by thermally forging said high expansion metal alloy.

3. A method according to claim 2, wherein said second metal component is provided by thermally forging said low expansion metal alloy.

4. A method according to claim 3, wherein said forging is carried out at a temperature of about 1050° C. to 1100° C.

5. A method according to claim 1, wherein said bonding is conducted by hot rolling the first and second metal components.

6. A method according to claim 5, wherein said hot rolling is carried out at a temperature of about 900° C. to 950° C.

7. A method according to claim 1, wherein said annealing step is commenced at 1050° C.

8. A method according to claim 1, wherein said annealing step is conducted after said bonding.

9. A method according to claim 8, wherein said annealing step is commenced at 1050° C.

10. A method according to claim 1, comprising cold-rolling the first and second metal components after said bonding.

11. A method according to claim 1, wherein said high expansion metal alloy is said first alloy.

12. A method according to claim 11, wherein said first alloy contains 15 to 25% by weight of manganese.

13. A method according to claim 12, wherein said low expansion metal alloy has a thermal expansion coefficient substantially the same as that of said high expansion metal alloy exhibited at a temperature lower than that at which the thermal expansion coefficient of the high expansion metal alloy rapidly increases.

14. A method according to claim 13, wherein said low expansion metal alloy is an austenitic stainless steel.

15. A method according to claim 1, wherein said high expansion metal alloy is said second alloy.

16. A method according to claim 15, wherein said second alloy contains 15 to 25% by weight of manganese.

17. A method according to claim 16, wherein said second alloy contains from 2 to 20% by weight of a mixture of chromium and cobalt and the balance of iron.

18. A method according to claim 15, 16 or 17, wherein said low expansion metal alloy has a thermal expansion coefficient substantially the same as that of said high expansion metal alloy exhibited at a temperature lower than that at which the thermal expansion coefficient of the high expansion metal alloy rapidly increases.

19. A method according to claim 16, wherein said low expansion metal alloy is an austenitic stainless steel.

* * * * *